United States Patent [19]

Matsushita et al.

[11] Patent Number: 4,855,853

[45] Date of Patent: Aug. 8, 1989

[54] ACTUATOR FOR POSITIONING HEADS IN MAGNETIC DISC APPARATUS

[75] Inventors: Toshio Matsushita; Hideaki Amano; Satoru Yamaura; Shigeo Nakamura, all of Odawara; Yasusuke Nakada, Tokyo, all of Japan

[73] Assignee: Hitachi, Ltd., Tokyo, Japan

[21] Appl. No.: 105,018

[22] Filed: Oct. 6, 1987

[30] Foreign Application Priority Data

Oct. 15, 1986 [JP] Japan ............................. 61-243151

[51] Int. Cl.$^4$ ............................................. G11B 21/08
[52] U.S. Cl. ...................................................... 360/106
[58] Field of Search ..................... 360/106, 105, 97–99, 360/104, 97.01, 98.01, 99.01

[56] References Cited

U.S. PATENT DOCUMENTS

| | | | |
|---|---|---|---|
| 3,988,657 | 10/1976 | Prival et al. | 318/594 |
| 4,196,456 | 4/1980 | Manzke et al. | 360/106 |
| 4,391,035 | 7/1983 | Van de Butt | 360/105 |
| 4,602,305 | 7/1986 | Ghose | 360/107 |
| 4,665,453 | 5/1987 | Mikamoto et al. | 360/132 |
| 4,695,910 | 9/1987 | Maruyama et al. | 360/133 |

FOREIGN PATENT DOCUMENTS 59-58669  4/1984  Japan .................. 360/106
60-159566 10/1985  Japan .

Primary Examiner—John H. Wolff
Assistant Examiner—Matthew J. Bussan
Attorney, Agent, or Firm—Fay, Sharpe, Beall, Fagan, Minnich & McKee

[57] ABSTRACT

An actuator mechanism for positioning magnetic heads includes arms that support a magnetic recording/reproducing head at one end thereof. Each of the arms is mounted about a shaft and supported for rotation. A coil support member is attached to the end of the arms opposite the head, and is made of a molded resin that integrally covers a voice coil motor used for causing the swinging movement of the arms. The molded resin of the coil support member is a synthetic resin mixed with a powered metal having a known specific gravity and thermal expansion coefficient. Thus, the weight of the synthetic resin can be adjusted to balance a portion including the magnetic heads and the arms with the coil support member in relation to the shaft. Additionally, the thermal expansion coefficient of the coil support member is selected to be substantially equal to that of the arms and the coil so that these components expand and contract to the same degree with variations in temperature to prevent deformation or cracks from occurring in the coil support member.

18 Claims, 2 Drawing Sheets

ACTUATOR FOR POSITIONING HEADS IN MAGNETIC DISC APPARATUS

BACKGROUND OF THE INVENTION

The present invention relates to an actuator for positioning heads in a magnetic disc apparatus, and more particularly to an actuator mechanism for positioning the heads, of the swing type that supports recording/reproducing magnetic heads such as to allow the swinging motion of them.

Typical examples of head positioning actuators of the type incorporated in a magnetic disc apparatus are disclosed, for example, in U.S. Pat. No. 4,391,035 and Japanese Utility Model Unexamined Publication No. 159566/1985. In these related disclosures, arms carrying magnetic heads are rotatably supported by a shaft, and a drive means including a coil is provided at the rear of the arms. Each of the arms is rotated about the shaft by electrically controlling the coil. Thus, the magnetic heads are positioned with respect to the surface of a magnetic disc.

In such known actuators, the coil which forms the magnetic circuit of a voice coil motor serving as the drive is incorporated in such a manner that the rear portion of the arms is resin-molded integrally with an arm base serving as a coil support member. This is advantageous in that the assembly of arms is simplified and in that there is no risk of the coil coming off due to vibration or the like.

Also, there is a demand for an improvement in the durability of the apparatus in a severe environment as well as a reduction in the size of a magnetic disc apparatus.

In the aforementioned prior devices, however, the arm base serving as the coil support member is resin-molded integrally with the rear portion of the arms and the coil. Thus, the thermal expansion coefficient of the coil differs from that of the resin. Accordingly, if such an apparatus is used when the temperature changes over a wide range, the arm base may be distorted, deformed or cracked due to the difference between the thermal expansion coefficients of the coil and the resin. This in that problem in that the reliability of the arm is low.

Also, in order to eliminate adverse influences due to external forces, it is necessary to balance a head arm carrying the heads with the arm base. However, in spite of the small size of the head arm, it is relatively heavy because it is made of a metal material. The arm base is provided with the coil, but its weight is reduced because the arm base is made of a molded resin. Therefore, in order to maintain the balance between the head arm and the head base, the volume of the arm base must be increased. This may hinder a reduction in the size of the apparatus.

SUMMARY OF THE INVENTION

It is therefore an object of the present invention to provide an actuator mechanism for positioning heads in which the size of a coil support member is reduced to balance arms carrying recording/reproducing heads with an arm base having the coil support member, that is, to ensure the balance of a primary angular moment of the movable portion of the actuator.

It is another object of the present invention to provide an actuator for positioning heads in which an arm base and a coil support member are prevented from being distorted or deformed due to variations in ambient temperature conditions.

It is still another object of the present invention to provide a magnetic disc apparatus in which the size of the coil support member is reduced to ensure the stability of the apparatus with respect to adverse influences such as external forces as well as to reduce the size of the apparatus.

To these ends, the actuator mechanism of the present invention comprises an arm supporting at one end thereof recording/reproducing heads. The arms supported are on a shaft for rotation about the shaft. A coil support member is made of a molded resin for integrally covering a voice coil motor serving as a drive for the arm. The coil support member is mounted on the other end of the arm. The synthetic resin is mixed with a powder having predetermined thermal expansion coefficient and specific gravity, preferably a powdered metal. If the weight of the synthetic resin mixed with the powdered metal is suitably adjusted, the coil support member can be balanced with the head of the arm in relation to the shaft, that is, it is possible to balance the primary angular moment of the movable portion of the actuator. The specific gravity of the powdered metal is generally greater than that of the synthetic resin. Accordingly, the volume of the coil support member can be made smaller than that of a prior art coil support member which is made of a synthetic resin containing no powdered metal so as to integrally cover a coil.

In addition, the kind of powdered metal is selected so that the thermal expansion coefficient of the coil support member may substantially equal that of the arm and the coil. Accordingly, even if the inventive actuator mechanism for positioning heads is employed over a wide temperature range, the coil support member expands and contracts substantially uniformly over the whole thereof. It is therefore possible to prevent distortion, deformation, cracks or the like from occurring in the coil support member.

In accordance with the present invention, it is possible to prevent distortion from occurring in the coil support member and to reduce the size of the coil support member. In addition, it is possible to obtain stability with respect to external forces. This feature provides the effect of reducing the size of the apparatus and of improving the reliability of the same.

Further objects, features and advantages of the present invention will become apparent from the following description of a preferred embodiment of the present invention with reference to the accompanying drawings.

DESCRIPTION OF THE PREFERRED EMBODIMENT

A preferred embodiment of the present invention will be described below with reference to the accompanying drawings.

Figure 1:
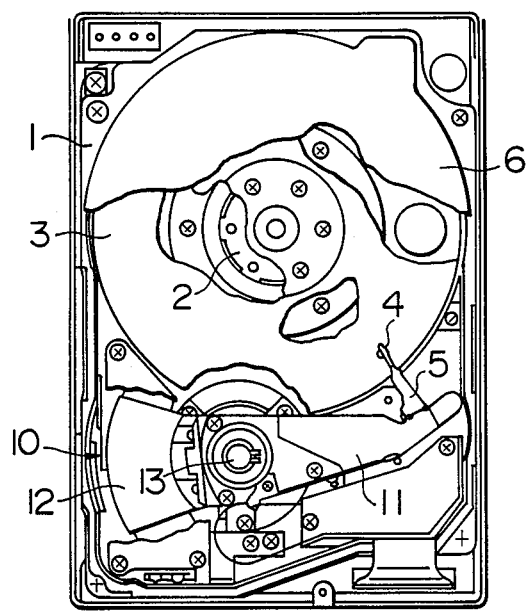
FIG. 1 is a top plan view, partially broken away, of a magnetic disc apparatus to which the present invention is applied.
Figure 2:
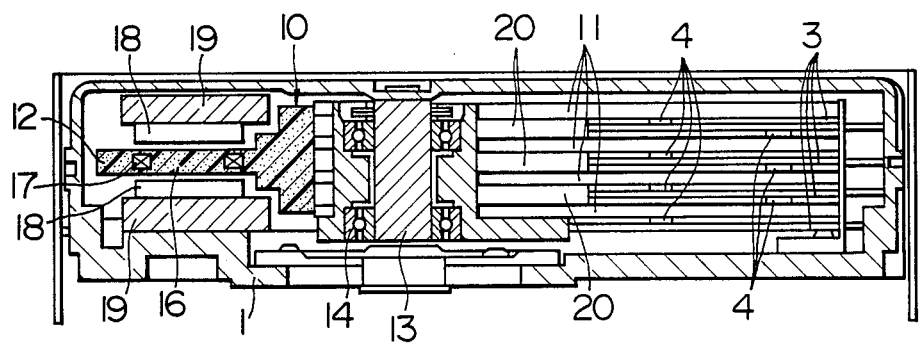
FIG. 2 is an enlarged, longitudinal section of the magnetic disc apparatus shown in FIG. 1.

Referring to FIGS. 1 and 2, the illustrated magnetic disc apparatus includes a plurality of rigid magnetic discs 3 fitted on a spindle 2 of a motor disposed on a base 1, and the magnetic discs 3 are vertically spaced apart at predetermined intervals as shown in FIG. 2. A cover 6 is shown in FIG. 1 in a partially broken away form for the sake of better understanding the internal mechanism associated with the magnetic discs 3. Magnetic heads 4 are supported in swinging relationship by a head positioning actuator indicated generally at 10. The magnetic heads 4 serve to record and reproduce data on the corresponding magnetic discs 3.

The head positioning actuator 10 includes an assembly of head arms 11 each having one end which supports the magnetic heads 4 and the other end which is rotatably supported; and a coil support member 12 mounted on the other end of the assembly of the head arms 11.

The head arms 11 are made from a metal sheet such as aluminum, and each of the magnetic heads 4 is attached to one end of each of the head arms 11 via an support arm 5. The other end of the assembly of the head arms 11 is supported on a bearing 14 attached to a shaft 13 which is fixed to the base 1, and is rotatable about the axis of the shaft 13. The number of the support arms 5 depends upon the number of the magnetic heads 4 which effect recording and reproduction on one side of each of the top and bottom ones of the magnetic discs 3 and both sides of the intermediate ones of the same. The support arms 5 are vertically spaced apart at predetermined intervals by means of arm spacers 20.

Figure 3:
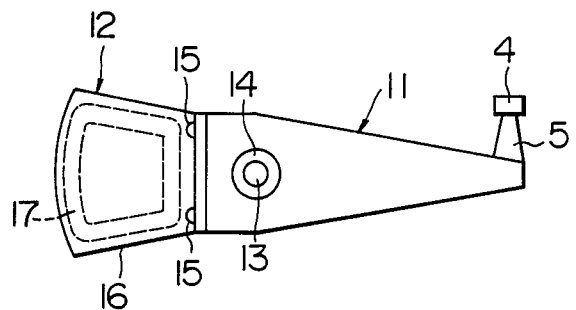
FIG. 3 is a diagrammatic, plan view of a preferred embodiment of an actuator for positioning heads in accordance with the present invention.
Figure 4:
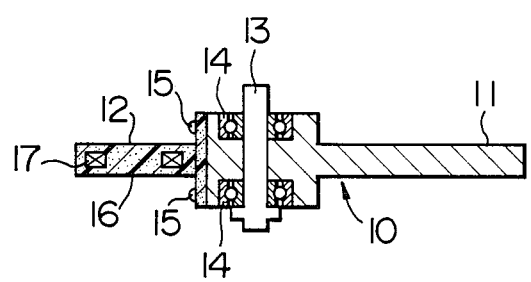
FIG. 4 is a diagrammatic, longitudinal section of the actuator shown in FIG. 4.

As shown in FIGS. 3 and 4, the coil support member 12 is attached to the other end of the assembly of the head arms 11 by machine screws 15. The coil 17 is integrally packed in a molded synthetic resin 16. The synthetic resin 16 preferably includes an epoxy resin as its main component.

As shown in FIG. 2, the coil 17 is interposed between permanent magnets 18. The permananet magnets 18 are secured in opposing relationship to an iron plate which is fixed to the base 1. Thus, a magnetic circuit is formed between the coil 17 and the permanents 18, to thereby drive the actuator 10. Specifically, the assembly of the head arms 11 is rotated about the shaft 13.

The molded synthetic resin 16 constituting the coil support member 12 is a feature of the present invention. The synthetic resin 16 is in advance mixed with a powdered metal. It is preferred that the powdered metal be the same as a substance constituting the head arm 11, in this embodiment, aluminium (having a thermal expansion coefficient of 17 to 23). However, the composition of the powdered metal need not necessarily be identical to that of the head arms 11. It is possible to employ and kind of material that has substantially the same or thermal expansion coefficient. For example, the powdered metal may be selected from a material including a copper oxide (thermal expansion coefficient: 17 to 19) as a main component, a mixture of this material and aluminium, and a mixture of other metal powders. However, if the powdered metal is selected from substances having thermal expansion coefficients signaificantly different from those of the constituent components of the head arms 11, the coil support member 12 might be deformed or distorted due to the excessive difference between the thermal expansion coefficients of the constituent materials. It is therefore necessary to carefully select the kinds of material to be combined. It will be readily understood that, if the kind of material for the head arms 11 is changed, a suitable metal material may be correspondingly selected.

Before the powdered metal is mixed with the synthetic resin 16, it is preferable to consider the specific gravity of the metal. More specifically, the amount of the powdered metal to be mixed with the synthetic resin 16 is adjusted so that the primary angular moment may be balanced when the actuator 10 is rotated.

It is to be noted that, if only the balance of the primary angular moment of the actuator is needed, the powdered metal need not necessarily be mixed with the synthetic resin 16. It will be readily understood that any kind of substance whose specific gravity is known can be employed.

The powdered metal is in advance mixed with the synthetic resin 16 by considering the above-described points. Before the coil 17 is covered by a molded resin, the amount of the metal powder to be mixed with the synthetic resin 16 is adjusted so that the coil support member 12 may be balanced with the head arms 11. In this manner, the coil support member 12 is molded.

Even if the head positioning actuator 10 incorporated in a magnetic disc apparatus is employed over a wide temperature range, the whole of the coil support member 12 expands and contracts substantially uniformly, since the thermal expansion coefficient of the coil support member 12 of the actuator 10 is substantially the same as those of the head arms 11 and the coil 17. Accordingly, it is possible to positively prevent distortion, deformation and cracks from ocurring in the coil support member 12.

Although the head arm 11 is made of a relatively heavy material such as a metal, the size of the coil 12 can be reduced, as compared with the prior art employing a coil support member formed by a combination of a coil and a synthetic resin. In addition, for this reason, the coil support 12 can be balanced with the head arm 11 to absorb external forces such as vibration, thereby improving stability with respect to the external forces.

Although one preferred embodiment of the present invention is described above, the present invention is not limited to the aforesaid embodiment and, of course, various modifications can be employed. For example, the head arms may be formed of ceramics instead of metal. In this case, it will be appreciated that the synthetic resin may be mixed with a powder having a predetermined thermal expansion coefficient and specific gravity which conform to the gist of the above description.

It is to be noted that the magnetic heads 4 may be attached directly to the head arms 11 without using the support arms 5. However, since this arrangement is not the primary object of the invention, the description thereof is omitted.

It will be readily understood by those skilled in the art that the present invention is applicable to another swing type of information recording apparatus such as an optical disc device in addition to the magnetic disc apparatus.

If it is intended to merely prevent the coil support member from being deformed or cracked, it is not always necessary to consider the balance between the coil support member and the head arms. This is the case with, for example, a disc apparatus of a so-called linear type in which its head arms are driven forward and backward radially over disc surfaces. In this case, a powdered metal to be mixed with the synthetic resin is preferably selected by considering the thermal expansion coefficient of the powdered metal in accordance with the above-described gist.

What is claimed is:

1. An actuator mechanism for positioning a head in a disc apparatus, comprising:
   (a) at least one head for recording and reproducing information on a disc;
   (b) an arm having one end supporting said head and the other end supported rotatably about a shaft;
   (c) a coil constituting a voice coil motor for causing said arm to rotate about said shaft to position said at least one head to a desired position on the disc; and
   (d) a coil support member made of a molded resin for covering said coil, said support member being attached to the other end of said arm, wherein said resin includes a mixture of a first resin powder mixed with a predetermined amount of a second powder having a specific gravity larger than said resin powder, the predetermined amount of said second powder being selected so as to balance a portion including said arm and said at least one head with a portion including said coil and said coil support member in relation to said shaft.

2. The actuator mechanism according to claim 1, wherein said second powder has a thermal expansion coefficient substantially equivalent to that of a material forming said arm.

3. The actuator mechanism according to claim 2, wherein said second powder is a powdered metal.

4. The actuator mechanism according to claim 3, wherein said second powder is a mixture of a plurality of powdered metals.

5. The actuator mechanism according to claim 2, wherein said arm is a member made of a predetermined kind of metal and wherein said second powder is a powdered metal containing the same components of said predetermined kind of metal.

6. An actuator mechanism for positioning a head in a disc apparatus, comprising:
   (a) at least one head for recording and reproducing information on a disc;
   (b) an arm for supporting said head at one end thereof, said arm means being made of a material having a predetermined thermal expansion coefficient;
   (c) a coil constituting a voice coil motor for driving said arm in a predetermined direction to position said at least one head to a desired position on the surface of said disc; and
   (d) a coil support member made of a molded resin for covering said coil, said coil support member being attached to another end of said arm, wherein said resin includes a mixture of a first resin powder and a second powder having a predetermined thermal expansion coefficient that causes the thermal expansion coefficient of said molded resin of said coil support member to be substantially equal to the thermal expansion coefficient of a material forming said coil and said arm.

7. The actuator mechanism according to claim 6, wherein said second powder is a powdered metal.

8. The actuator mechanism according to claim 7, wherein said second powder is a mixture of a plurality of powdered metals.

9. The actuator mechanism according to claim 6, wherein said arm is a member made of a predetermined kind of metal and wherein said second powder is a powdered metal containing the same components of said predetermined kind of metal.

10. The actuator mechanism according to claim 6, further including a shaft for rotatably supporting said arm, and said second powder mixed with said resin powder to form said coil support means having a specific gravity that is greater than that of said first resin powder, the amount of said second powder to be mixed with said first resin powder being adjusted so as to balance a portion including said arm and said head with a portion including said coil and said coil support member in relation to said shaft.

11. The actuator mechanism according to claim 10, wherein said second powder is a powdered metal.

12. The actuator mechanism according to claim 11, wherein said arm is a member made of a predetermined kind of metal and wherein said second powder is a powdered metal containing the same components of said predetermined kind of metal.

13. The actuator mechanism according to claim 6, wherein said voice coil motor is arranged to drive said arm in the radial direction of said disc.

14. An actuator mechanism for positioning heads in a magnetic disc apparatus, comprising:
   (a) a plurality of magnetic discs rotatably supported by a spindle;
   (b) a plurality of magnetic heads for recording and reproducing information on said plurality of magnetic discs;
   (c) a plurality of arms each having one end supporting each of said magnetic heads;
   (d) a shaft for supporting in common said plurality of arms for rotation about said shaft;
   (e) a coil constituting a voice coil motor for simultaneously causing said plurality of arms to rotate to position said plurality of magnetic heads to desired positions; and
   (f) a coil support member made of a molded resin for covering said coil, said coil support member being attached to another end of each of said plurality of arms, wherein said resin is mixed with a predetermined amount of powdered metal having a specific gravity greater than that of said resin, the amount of said powdered metal mixed with said resin being adjusted so as to balance a portion including said arms and said heads with a portion including said coil and said coil support member in relation to said shaft.

15. The actuator mechanism according to claim 14, wherein the powdered metal is selected so as to cause the thermal expansion coefficients of the constituent materials for said arms and said coil to substantially equal the thermal expansion coefficient of said coil support member.

16. The actuator mechanism according to claim 15, wherein said powdered metal is a mixture of a plurality of powdered metals.

17. The actuator mechanism according to claim 15, wherein the composition of said powdered metal is identical to that of said constituent material for said arms.

18. The actuator mechanism according to claim 15, wherein said resin includes an epoxy resin as its main component.

* * * * *